United States Patent [19]
Meyers et al.

[11] Patent Number: 5,801,889
[45] Date of Patent: Sep. 1, 1998

[54] TECHNIQUE TO ELIMINATE SCATTERED LIGHT IN DIFFRACTIVE OPTICAL ELEMENTS

[75] Inventors: Mark M. Meyers, Hamlin; Richard E. Albrecht, Honeoye Falls, both of N.Y.

[73] Assignee: Eastman Kodak Company, Rochester, N.Y.

[21] Appl. No.: 639,645

[22] Filed: Apr. 29, 1996

[51] Int. Cl.$^6$ .................... G02B 3/08; G02B 5/12
[52] U.S. Cl. .................... 359/743; 359/520
[58] Field of Search .................... 359/741, 742, 359/743, 738, 570, 571, 569

[56] References Cited

U.S. PATENT DOCUMENTS

| | | | |
|---|---|---|---|
| 3,237,508 | 3/1966 | Keller et al. | 359/571 |
| 3,784,282 | 1/1974 | Yamazaki et al. | 359/738 |
| 4,210,391 | 7/1980 | Cohen | 359/743 |
| 4,995,715 | 2/1991 | Cohen | 359/743 |
| 5,080,465 | 1/1992 | Laude | 359/569 |
| 5,260,828 | 11/1993 | Londono et al. | 359/569 |
| 5,543,966 | 8/1996 | Meyers | 359/569 |

*Primary Examiner*—Georgia Y. Epps
*Assistant Examiner*—Ricky Mack
*Attorney, Agent, or Firm*—Svetlana Z. Short

[57] ABSTRACT

Diffractive optics using surface relief profiles, also known as blazed gratings having ramps and edges or steps (also referred to as blazed facets with discontinuities at the interfaces between adjacent facets) defining grating lines and phase delays to which light propagating through the grating are subject. Diffractive lenses which are known as phased Fresnel zone plate lenses or kinoforms, also have annular blazed facets with discontinuities, steps at the interface between adjacent facets at the steps which facets define the zones of the lens. These steps are either aligned parallel to the light incident on the grating or coated with an optically opaque material, thereby preventing the transmission of incident light which is not diffracted, but would be scattered or transmitted at the steps. The contrast and quality of an image provided by the diffractive lens at a plane spaced from the grating, which may be the focal plane of the diffractive lens, is therefore enhanced.

24 Claims, 3 Drawing Sheets

TECHNIQUE TO ELIMINATE SCATTERED LIGHT IN DIFFRACTIVE OPTICAL ELEMENTS

DESCRIPTION

1. Field of the Invention

The present invention relates to diffractive optical elements and methods of making same, and particularly to diffractive optical elements wherein the transmission of undiffracted and scattered light is minimized thereby improving the performance of the elements.

The invention is especially suitable for providing an improved hybrid refractive/diffractive lens, having a blazed diffractive optical element lens on a surface thereof, which is useful as a wide angle lens for photographic camera applications.

2. Background of the Invention

Hybrid diffractive/refractive lenses are made up of a refractive element having opposite surfaces on one or both of which gratings are formed. These gratings may be surface relief profiles, which define a surface of blazed facets with discontinuities between adjacent facets; these facets having sloping portions or ramps rising from the surface to a peak height then rapidly dropping back to the surface, thereby forming a step or edge which define the discontinuities. Such diffractive optical lens elements and especially lens elements for photographic applications and methods of making same are the subject matter of the following patent application filed in the name of an inventor hereof: U.S. Ser. Nos. 08/174,437, filed Dec. 29, 1993; 08/175,708, filed Dec. 29, 1993; and 08/292,349, filed Aug. 17, 1994. For further information respecting diffractive optical elements and particularly hybrid diffractive lenses reference may be had to U.S. Pat. No. 5,013,113 issued to D. A. Buralli et al. on May 7, 1991 and U.S. Pat. No. 5,078,513 issued to K. Spaulding et al. on Jan. 7, 1992.

An exemplary hybrid refractive/diffractive lens is illustrated in FIG. 1. The lens 10 shown in FIG. 1 is generally of a meniscus shape having curved surfaces 12 and 14. The surface 14 serves as the base curve of a diffractive optical element 16 having diffractive facets provided by smoothly sloping ramps 16 and steps 18 which are separated by annular zones of varying widths which decrease in a direction away from the optical axis 20 of the lens 10. These steps 18, which provide a discontinuous change in surface height, have in accordance with the invention, been found to contribute substantially to scattered light which reduces image contrast and can create bright glare spots in the image of the object or scene focused by the lens. This scattered light occurs in addition to the undiffracted light which arises because of the use of a diffractive surface to cover a wide wavelength band, and is less controlled and less predictable, since it often occurs when a bright source (such as the sun) is at the edge of or just outside of the field of view of the lens. This is shown in FIG. 1 as the bundle of rays 22 which provide scattering as shown by the low intensity scattered light and also by the bright spot on the image or focal plane 24 due to the undiffracted, scattered beam 26. This beam passes through an aperture 28 even though it is undesired scattered light.

The edges of the diffractive surface are parallel to the optical axis or normal to the surface 14 from which the blaze projects as is the case with diffractive lenses and other diffractive elements which have, so far as is presently known, heretofore been proposed. The contribution of the scattering or flare to the degradation of the image quality (or reduction of the Strehl ratio) is significantly larger for applications with large dynamic ranges of intensity of illumination or source brightness, such as encountered in the use of diffractive lenses and particularly hybrid diffractive/refractive photographic camera lenses. The problem also exists in laser and point source based applications such as optical disks and laser printers using conventional diffractive optics.

The scattered light intensity when light is incident from an off axis point on a diffractive surface, such as the light in the bundle 22 and even in some cases for light from the object as indicated by the bundle of rays 30 in FIG. 1. There will be scattering occurring which increases with the angle of incidence θ of the incident light on the diffractive element. The fraction of light which is scattered or transmitted through the facets is related to the angle of incidence θ, the height of the steps or edge 18 and the width of the diffractive zones, dr, as measured between the steps 18. This is true whether single or multi-order diffraction is utilized.

For light incident at the angle θ, the fraction of light scattered or transmitted at the edge 18 is given by $$L(dr, \theta) = \frac{H \tan(\theta)}{dr}$$

where, H is the height of the diffractive feature or step 18 and dr is the spacing between the steps (the zone width).

FIG. 2 is a plot of the fraction of the light amount (intensity) intercepted for a given angle of incidence θ as a function of spacing dr between the diffractive features. FIG. 3 is a plot of the fractional losses at the edge of the features as a function of angle of incidence where θ varies for each value of dr. FIG. 3 is a plot of the fractional losses L(θ) as a function of θ for a given spacing, dr, between facets. θ may also be considered to be approximately the field angle of the light from the object being focused by the lens.

SUMMARY OF THE INVENTION

The invention includes the discovery that the scattered light or flare is to a significant extent governed by the edges or steps of the facets constituting the blaze profile of a diffractive lens on a surface, and especially the surface of diffractive part of the hybrid refractive/diffractive lens. It has heretofore been proposed to use a "venetian blind" between diffractive gratings to block undesired diffracted orders. See T. W. Stone and N. George, U.S. Pat. No. 4,786,124 issued Nov. 22, 1988. The venetian blind principle is applicable to controlling of the already diffracted light and is not effective in controlling scattered light or flare beams due to the edges or steps of the diffractive features, which are highly likely to pass through the slats of the venetian blind. The problem of scattering and flare is therefore not completely addressed in the venetian blind approach proposed in the Stone and George patent.

In accordance with the invention, the light which is incident on the diffractive optic is controlled by controlling the transmission of the light through the discontinuities of the diffractive surface, steps or edges of the diffractive features. In one embodiment the diffractive facets are aligned with the angle of incidence of the light, at least in a region of the diffractive optic. By aligning the edges or steps of the diffractive facets with incident light on the diffractive surface (and particularly to the base curve of the optic) the scattering and transmission through the edges of the facets is substantially obviated, since the cross-section of the edge seen by the incident beam is nearly zero. This is apparent from the geometry of the lens, and the above equation for L(dr,θ) since the incident beam is nearly at the angle of θ of zero as that angle is defined in the above equation for the amount of scattered light.

The invention also may be embodied in a diffractive optic using opaque coatings on the discontinuities (the edges or step portions) of the diffractive facets. This eliminates scattered light from off optical axis sources and from strongly converging and diverging beams.

Accordingly, it is the principal object of the invention to provide improved diffractive optical elements and methods of making same.

It is a still further object of the invention to provide improved hybrid refractive/diffractive lenses in which the adverse effect of scattering or flare are substantially eliminated, and also to a method of making such lenses.

It is a still further object of the present invention to provide an improved laser collimator or objective lens having a diffractive optical element in which the performance of the lens, in terms of image quality or Strehl ratio, is enhanced, and also to a method of making such a lens.

Briefly described, diffractive optical elements, in accordance with the invention, are elements on which light is incident on a surface of the element at certain angles of incidence thereto and which are deflected at a certain diffraction angle for a certain diffraction order. The invention reduces the amount of light which is scattered by the diffractive optical element with respect to the amount of light which is diffracted, (i.e., the transmission of undiffracted or scattered light. The optical element is formed with a relief profile on the surface thereof which provides the substrate for the element. The profile has sloping portions or ramps which increase in height from the surface to peaks which then return to the surface from the peaks and form steps or edges of the profile (i.e. facets with discontinuities between adjacent facets). The transmission of light incident on the surface via the steps across the aperture of the element is controlled so that light which is incident at other than the angle incidence which provides diffraction at the desired angle is reduced, in that light scattered and flare produced at the steps is substantially eliminated. The transmission may be controlled by aligning the steps along the angle of incidence of the local chief and marginal rays, thereby removing scattering surfaces presented by the steps. In the case of a diffractive lens the inclination of the steps varies as a function of position (radial distance from the optical axis) across the clear aperture. The transmission may also be controlled by coating the steps with a material which attenuates the transmission of light therethrough or reflection therefrom, as by absorbing the light subject to scattering at the steps.

BRIEF DESCRIPTION OF THE DRAWINGS

The foregoing and other objects, features and advantages of the invention as well as presently preferred embodiments thereof will become more apparent from a reading of the following description in connection with the accompanying drawings in which.

DETAILED DESCRIPTION

Figure 4:
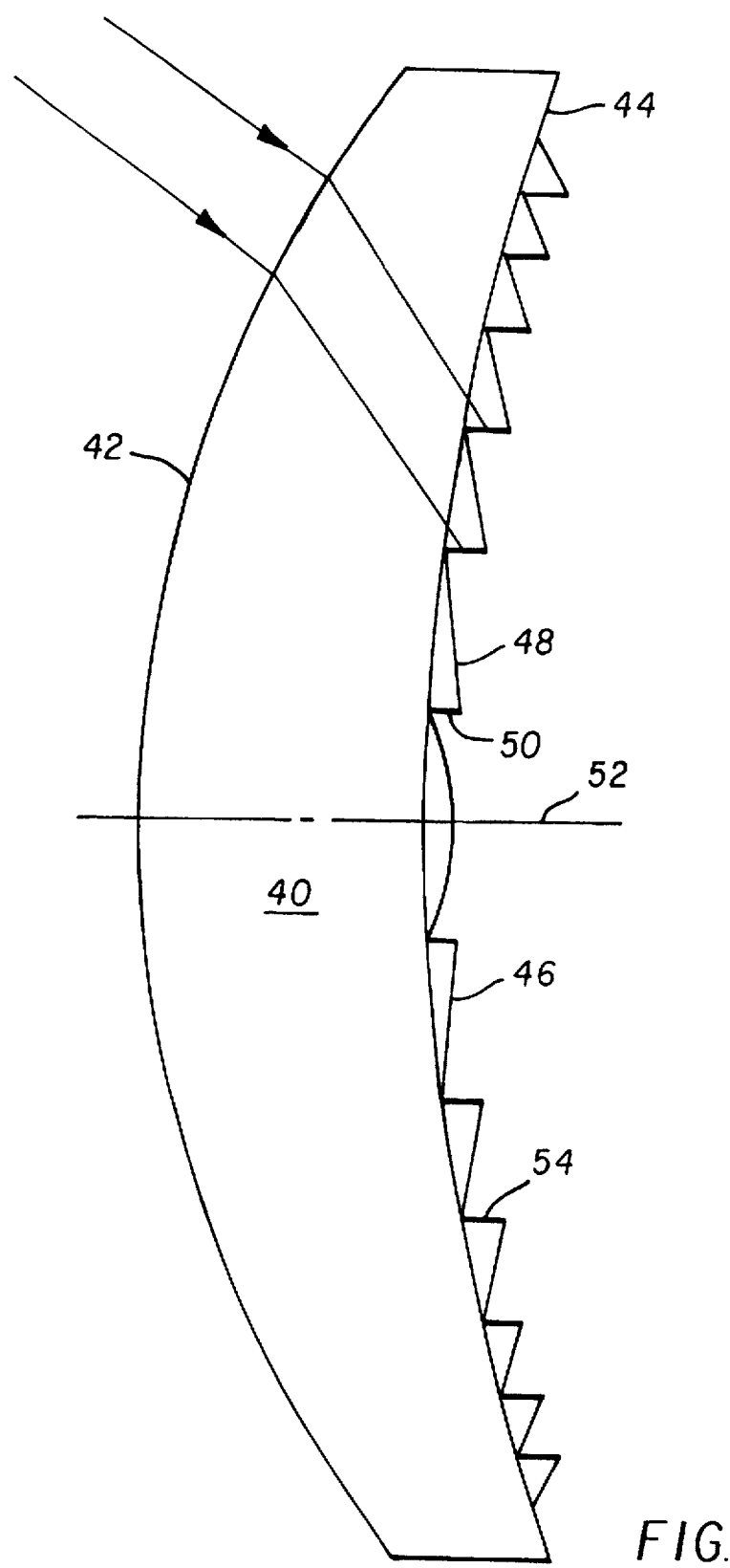
FIG. 4 is a schematic diagram of an improved refractive/diffractive lens in accordance with one embodiment of the invention.

Referring to FIG. 4 there is shown a meniscus lens 40 having a convex aspherical surface 42 and a concave spherical surface 44, which providing the base curve or substrate surface of a diffractive lens having a blaze profile 46. The profile is made up of annular facets of ramps 48 and edges or steps 50. The annular facets are rings around the optical axis 52 of the lens.

The ramps may alternatively be in the form of curved echelettes or a series of binary steps. The design of the lens may be in accordance with the above-identified U.S. patent applications which are filed in the name of an inventor hereof. An opaque coating 54 is applied on the edges or steps 50 thereby preventing stray light from impinging on the image plane which is to the right, along the optical axis 52. This image plane may be the focal plane through which film in a camera equipped with the lens 40 is advanced. The plane may be curved or flat. The lens is a wide-angle lens and covers the entire camera frame. The coating is a very thin layer of an opaque material. The material may suitably be dyed photoresist or water soluble removable jet black. Any light which did not pass through the ramp or top face 46 of the diffractive facets is absorbed or attenuated by the coating 50. Since the otherwise scattered light is absorbed rather than transmitted, instances of bright flare in the scene focused at the image plane are substantially eliminated. Such instances as bright flare may be caused by the sun at the edge of the field of view of the lens and is included in the nondiffracted light which is absorbed by the coating 54 on the steps 50. Since unwanted scattered light in the image plane is reduced by the coating 54, the contrast of the scene imaged at the focal plane is increased. In other words the coating 54 generally prevents a reduction in the Strehl ratio the image formed by lens.

Although photographic camera applications for the lens exist, optical disk systems and laser printers may utilize the invention, and provide objective lenses thereof, inasmuch as light scattered off the edges of the facets reduces contrast and increases spot size for such applications, just as in the case of the photographic camera lens application. Another advantage of the coatings is that they appear as opaque rings of microscopic width thereby minimizing reduction in transmittance of the lens as a whole due to reduction of the clear aperture area by the opaque material. By microscopic width of the coating is meant a width from about 0.4 to 2.0 micrometers, which depend upon the techniques used for applying the coatings 54. The reduction in clear aperture is also minimized, since the incident rays which are diffracted are generally paraxial rays to which the coatings 54 present only the microscopic cross section which may block these rays.

The coating 54 may be applied by techniques such as dip, spin or wiper blade coating of photoresist onto the entire diffractive surface. The photoresist may be applied either by using projection printing through a photomask or by forming an image of the photomask on the diffractive surface using the lens or a negative imager, such as the 1:1 Offner slit scanning system. The photomask is formed so that a small ring of photoresist, or whatever photosensitive is used, is left on the inside and outside of the edge 50 of the diffractive features (the facets). The photoresist material can then be treated with a heavily absorbing dye or pigment, selected from the materials set forth above so that the edge 50 is coated to be substantially opaque.

Alternatively a solvent soluble solution containing an absorbing dye can be coated on the entire surface of the diffractive element and a photopolymer or photoresist can be overcoated and used as an etch or solvent removal mask for the underlying absorbing coating after being exposed with the photomask pattern.

The facets may be formed using diamond turning techniques. The diamond tip can be programmed to be translated to fabricate the diffractive surface or the surface of a mold may be cut to provide the diffractive surface.

Figure 1:
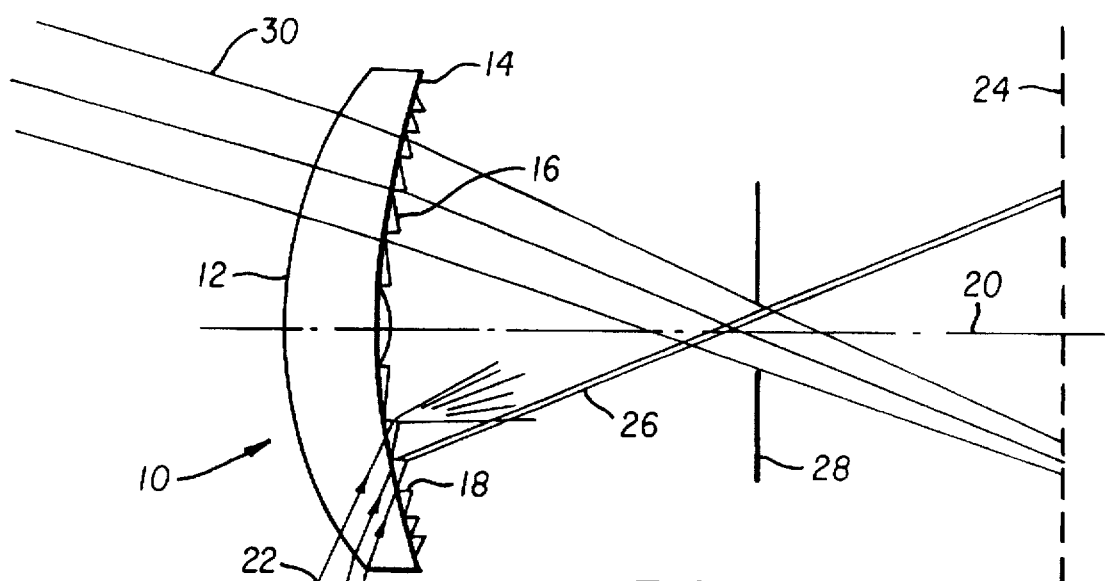
FIG. 1 is a schematic diagram of a conventional meniscus type field lens for photographic application showing scattered light from the edges of the diffractive facets; the lens being in accordance with the prior art.
Figure 2:
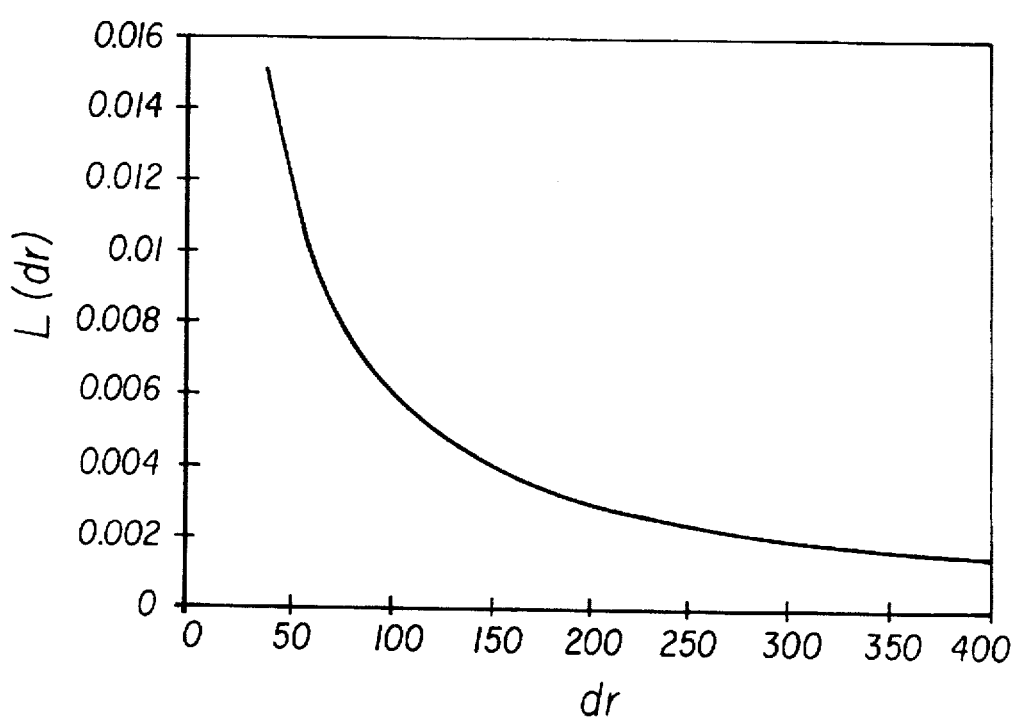
FIG. 2 is a plot of the scattered light intensity as a function of the zone width of a diffractive lens such as shown in FIG. 1.
Figure 3:
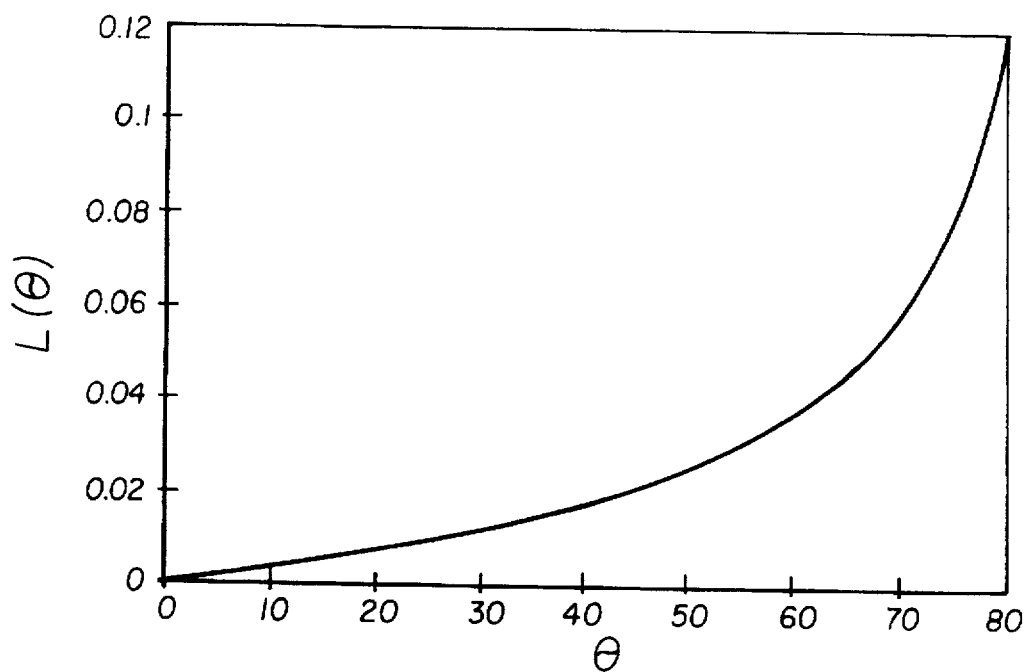
FIG. 3 is a plot of the scattered light intensity as a function of angle of incidence for a fixed zone width (dr), which illustrates scattering by the edges of the diffractive lens shown in FIG. 1 as a function of field angle.
Figure 5:
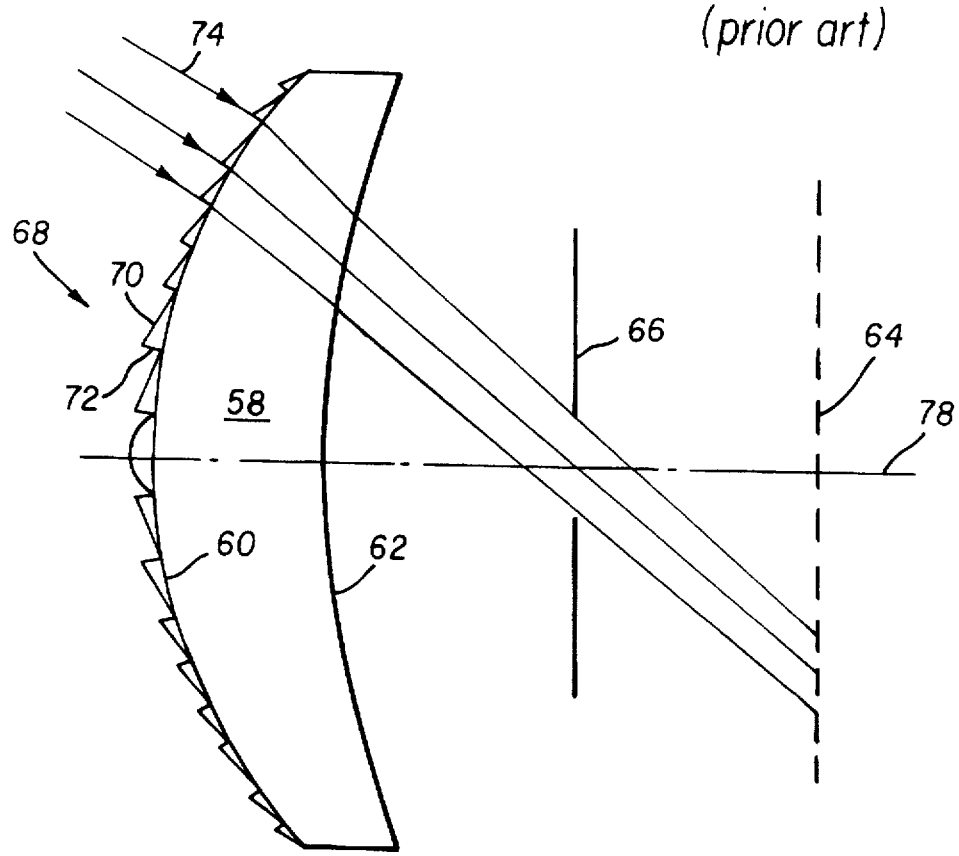
FIG. 5 is a schematic diagram of an improved refractive/diffractive lens in accordance with another embodiment of the invention.

Referring to FIG. 5 there is shown a lens 58 which is a meniscus with a concave spherical surface 60 facing the object and a convex spherical surface 62 facing the image plane 64. An aperture 66 may be located between the concave surface 62 and the image plane 64. An aperture like 66 may be used and similarly positioned in the embodiment shown in FIG. 4.

The diffractive optical element 68 is formed of annular zones each containing a facet consisting of a ramp 70 and an edge or step 72. The edges or steps are aligned with the incident light paths as shown by the exemplary bundle of rays 74. In other words, the edges are inclined as a function of position (radial distance) across the lens aperture. Thus the inclination varies as a function of position. In effect the edges are aligned with rays of the incident light, which may be local marginal rays or the local chief ray.

When the profile providing the diffractive lens on the surface 60 is made by diamond tip machining, the tip is programmed, in its movement to be translated to fabricate the edges 72 to be substantially parallel to the incident light across the aperture. This may be done by varying the angle of tip in forming the edges 72. Similarly may be made with a programmed diamond tip and the lens 58 is molded, say of plastic such as acrylic or some other transmissive polymer using the mold.

In the event that the profile of the ramps is a step ramp or also known as a binary-type diffractive optic, etching which forms the ramps may be performed with the substrate curve 60 at an angle and the substrate curve may be located on a rotary translation stage to allow a plasma etch beam to uniformly undercut the edges of the diffractive optic as an axially symmetric part. The angle of the edges 72 of the facets with respect to the optical axis 78 changes as a function of the radial position within the clear aperture of the lens. Accordingly transmission of undiffracted, scattered and transmitted flare light is minimized. The edges also present a minimal cross section to the incident beam.

From the foregoing description it will be apparent that there has been provided improved diffractive optical elements wherein the diffractive optic is formed and geometrically positioned so as to reduce scattered or flare light at an image plane. Variations and modifications in the herein described diffractive optics and their application both in planar gratings, as well as diffractive lenses, will of course become apparent to those skilled in the art. Accordingly the foregoing description should be taken as illustrative and not in a limiting sense.

What is claimed is:

1. A method of making a diffractive optical element on a surface, which element diffracts light incident on said surface at certain angles of incidence and for a certain diffractive order at a certain angle of diffraction to said surface, so as to reduce the amount of light which is scattered by said element with respect to the amount of light which is diffracted, said method comprising the steps of forming a surface relief profile on said surface of portions which increase in height to peaks spaced from said surface and decrease in steps extending from said peaks toward said surface, and controlling the transmission of light incident on said surface via said steps at other than said angles of incidence.

2. The method according to claim 1 wherein said controlling step is carried out by aligning said steps along said angles of incidence as a function of position of each of the steps across the element thereby minimizing scattering surfaces presented by said steps.

3. The method according to claim 1 wherein said controlling step is carried out by coating said steps with a material which attenuates, blocks or absorbs the transmission of light therethrough thereby preventing transmission of light subject to scattering and the production of flare to a plane spaced from said surface.

4. The method according to claim 1 wherein said element has an axis therethrough and said surface relief forming step is carried out by forming said steps at inclinations to said axis which vary as a function of position across the element.

5. The method according to claim 1 wherein said surface relief profile forming step is carried out to provide said portions as adjacent facets having discontinuities between said adjacent facets at said steps.

6. The method according to claim 1 wherein said method provides a diffractive lens having an optical axis which focuses the incident light at an image plane on one side of said lens opposite from an object side thereof, and said forming step is carried out by forming said relief profile as a plurality of annular rings of varying widths between said steps, each of said rings having said sloping portion and said step portion.

7. The method according to claim 6 wherein light is locally incident at different distances from said axis and said forming step is carried out so that the amount of light which is scattered at each of said steps is minimized.

8. The method according to claim 7 wherein said locally incident light includes a chief ray along said axis and local marginal rays, and said steps along said chief and marginal rays are, respectively, aligned therewith.

9. The method according to claim 6 wherein said surface is generally curved about a certain radius to said optical axis.

10. The method according to claim 6 wherein said forming step is carried out to a arrange said steps of said profile to define surfaces paralleling said optical axis, and said controlling step is carried out by coating said surfaces defined by said steps with optically opaque material.

11. The method according to claim 10 wherein said surface is generally curved about a certain radius to said optical axis.

12. The system according to claim 10 wherein said surface is generally curved about a certain radius to said optical axis.

13. A method of making a diffractive lens having facets on a surface thereof, which facets are adjacent to each other and have discontinuities therebetween, said lens having an aperture through which light from a field of view incident on said lens is diffractively focused by said lens while being transmitted through said lens, said method comprising the step of forming said discontinuities to present non-scattering surfaces to light, which is not transmitted and focussed or from outside the field of view, and wherein said forming step is carried out by aligning said non scattering surfaces presented by said discontinuities along angles of incidence of said light from said field of view as a function of position of the discontinuities across said lens aperture thereby removing scattering surfaces.

14. A diffractive optical element comprising a transmissive substrate having a surface, a relief profile on said surface of portions which increase in height to peaks spaced from said surface and decrease in steps extending from said peaks toward said surface, which diffracts light incident on said surface at certain angles of incidence and for a certain diffractive order at a certain angle of diffraction to said surface, and means for controlling the transmission of light incident on said surface via said steps at other than said angles of incidence so as to reduce the amount of light which is scattered by said element with respect to the amount of light which is diffracted.

15. The element according to claim 14 wherein said controlling means is provided by said steps being aligned along said angles of incidence as a function of position of each of the steps across the element thereby minimizing scattering surfaces presented by said steps.

16. The element according to claim 14 wherein said means is provided by a coating on said steps of a material which attenuates, blocks or absorbs the transmission of light therethrough, thereby preventing transmission of light subject to scattering and the production of flare to a plane spaced from said surface.

17. The element according to claim 14 wherein said element has an axis therethrough and said surface, said steps are disposed at inclinations to said axis which vary as a function of position across the element.

18. The element according to claim 14 wherein said surface relief profile portions are adjacent facets having discontinuities between said adjacent facts at said steps.

19. The element according to claim 14 wherein said element is a diffractive lens having an optical axis which focuses the incident light at an image plane on one side of said lens opposite from an object side thereof, and said relief profile defines a plurality of annular rings of varying widths between said steps, each of said rings having being blazed annular facets said portions and said steps.

20. The lens according to claim 19 wherein light is locally incident at different distances from said axis and said steps are oriented at inclinations depending upon the angles of incident light which are diffracted to said focus.

21. The lens according to claim 20 wherein said locally incident light includes a chief ray along said axis and local marginal rays, and said steps along said chief and marginal rays are, respectively, aligned therewith.

22. The lens according to claim 19 wherein said surface is generally curved about a certain radius to said optical axis.

23. The lens according to claim 19 wherein said steps of said profile define surfaces paralleling said optical axis, and said controlling means is provided by coatings on said surfaces defined by said steps of optically opaque material.

24. In a diffractive lens having facets which are adjacent to each other and have discontinuities therebetween, said lens having an aperture through which light from a field of view incident on said lens is diffractively focused by said lens while being transmitted through said lens, to a focus, the improvement comprising non-scattering surfaces for light which is not transmitted to said focus from outside the filed of view on said discontinuities, and wherein said discontinuities define surfaces disposed at angles of incidence of said light from said field of view and have inclinations which vary as a function of position of the discontinuities across said lens aperture thereby minimizing the cross section presented by the surfaces defined by said discontinuities to said light which is diffracted to said focus.

* * * * *

UNITED STATES PATENT AND TRADEMARK OFFICE
CERTIFICATE OF CORRECTION

PATENT NO.  : 5,801,889
DATED       : September 1, 1998
INVENTOR(S) : Meyers, et al It is certified that error appears in the above-identified patent and that said Letters Patent is hereby corrected as shown below:

Title page, insert the following item:
   -- [60] Provisional application No. 60/002,439, August 16, 1995 --

Column 1, line 4, insert the following:
-- CROSS REFERENCE TO RELATED APPLICATION
Reference is made to and priority claimed from U.S. Provisional Application Serial No. 60/002,439, filed August 16, 1995, entitled Technique To Eliminate Scattered Light In Diffractive Optial Elements. --

Signed and Sealed this

Second Day of March, 1999

Attest:

Q. TODD DICKINSON

*Attesting Officer*  *Acting Commissioner of Patents and Trademarks*